US012719183B2

(12) United States Patent
Singh et al.

(10) Patent No.: US 12,719,183 B2
(45) Date of Patent: Aug. 25, 2026

(54) ANTENNA TILT RECOMMENDATIONS THROUGH ANTENNA FOOTPRINT ANALYSIS AND CONTAINMENT

(71) Applicant: T-MOBILE INNOVATIONS LLC, Overland Park, KS (US)

(72) Inventors: Gurpreet Singh, Manteca, CA (US); Stephen Todd Vancleve, Walnut Creek, CA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 574 days.

(21) Appl. No.: 18/113,416

(22) Filed: Feb. 23, 2023

(65) Prior Publication Data

US 2024/0291171 A1 Aug. 29, 2024

(51) Int. Cl.
*H01Q 25/00* (2006.01)
*H01Q 1/24* (2006.01)

(52) U.S. Cl.
CPC .......... *H01Q 25/002* (2013.01); *H01Q 1/246* (2013.01)

(58) Field of Classification Search
CPC ..... H01Q 25/002; H01Q 1/246; H04W 72/08; H04W 24/08; H04W 64/00; H04B 17/318
See application file for complete search history.

(56) References Cited

U.S. PATENT DOCUMENTS

| | | | | |
|---|---|---|---|---|
| 2020/0187213 | A1* | 6/2020 | Yun | H04B 17/345 |
| 2022/0225127 | A1* | 7/2022 | Imran | H04B 17/309 |
| 2022/0286863 | A1* | 9/2022 | Sarkar | H04W 24/02 |

* cited by examiner

*Primary Examiner* — Iqbal Zaidi
(74) *Attorney, Agent, or Firm* — SHOOK, HARDY & BACON L.L.P.

(57) ABSTRACT

Aspects provided herein provide methods, systems, and a non-transitory computer storage medium storing computer instructions for determining antenna tilt in a network are provided. The method begins with determining an inter-site distance for at least one adjacent cell site within a beam width of an antenna of at least one cell site. Next, the inter-site distance is calculated at a predetermined overlap with at least one adjacent antenna of an adjacent cell site. The antenna is then tilted to move the calculated inter-site distance to be within a half-power beam width of the antenna. A latitude and longitude within a half-power point of the beam width of the antenna is then calculated. The tilt angel of the antenna is then calculated.

17 Claims, 9 Drawing Sheets

Real World Example

ANTENNA TILT RECOMMENDATIONS THROUGH ANTENNA FOOTPRINT ANALYSIS AND CONTAINMENT

BACKGROUND

Base stations in cellular networks need to be carefully sited to prevent unintentional interference to other cells in the network and to reduce overlap. The antenna also be tilted properly to avoid over-shooting and under-shooting. Over-shooting signal may cause interference while undershooting signals may cause lack of signal or service to customers. Such over-shoots and under-shoots can produce interference and result in weaker reception to the customer. The 3 dB points of the antenna's elevation and azimuth main beamwidth pattern are often not properly modeled for the most efficient use of antenna performance characteristics. Current antenna tilt recommendations can fail to account for terrain, tall buildings, and fringe cell sites. In addition, cell sites' operational characteristics can change over time as buildings are added or additional cell sites are added nearby, necessitating a change in an antenna tilt.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

According to aspects herein, methods and systems for determining antenna tilt in a network are provided. The method begins with determining an inter-site distance for at least one adjacent cell site within a beam width of an antenna of at least one cell site. Next, the inter-site distance is calculated at a predetermined overlap with at least one adjacent antenna of an adjacent cell site. The antenna is then tilted to move the calculated inter-site distance to be within a half-power beam width of the antenna. A latitude and longitude within a half-power point of the beam width of the antenna is then calculated. The tilt angel of the antenna is then calculated.

In a further embodiment, a system for determining antenna tilt in a network is provided. The system includes a processor and one or more computer storage hardware devices storing computer-usable instructions that, when used by the processor cause the processor to perform operations. The operations performed by the processor are: determine an inter-site distance for at least one adjacent cell site within a beam width of an antenna of at least one cell site; calculate the inter-site distance at a predetermined overlap with at least one adjacent antenna of an adjacent cell site; tilt the antenna to move the calculated inter-site distance to be within a half-power beam width of the antenna; calculate a latitude and longitude within a half power point of the beam width of the antenna; and calculate a tilt angle of the antenna.

An additional embodiment provides a non-transitory computer storage media storing computer-useable instructions that, when executed by one or more processors cause the processors to determine an inter-site distance for at least one adjacent cell site within a beam width of an antenna of at least one cell site. The processors then calculate the inter-site distance at a predetermined overlap with at least one adjacent antenna of an adjacent cell site. The processors then tilt the antenna to move the calculated inter-site distance to be within a half-power beam width of the antenna. A latitude and longitude within a half-power point of the beam width of the antenna is then calculated. The processors then calculate a tilt angle of the antenna.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
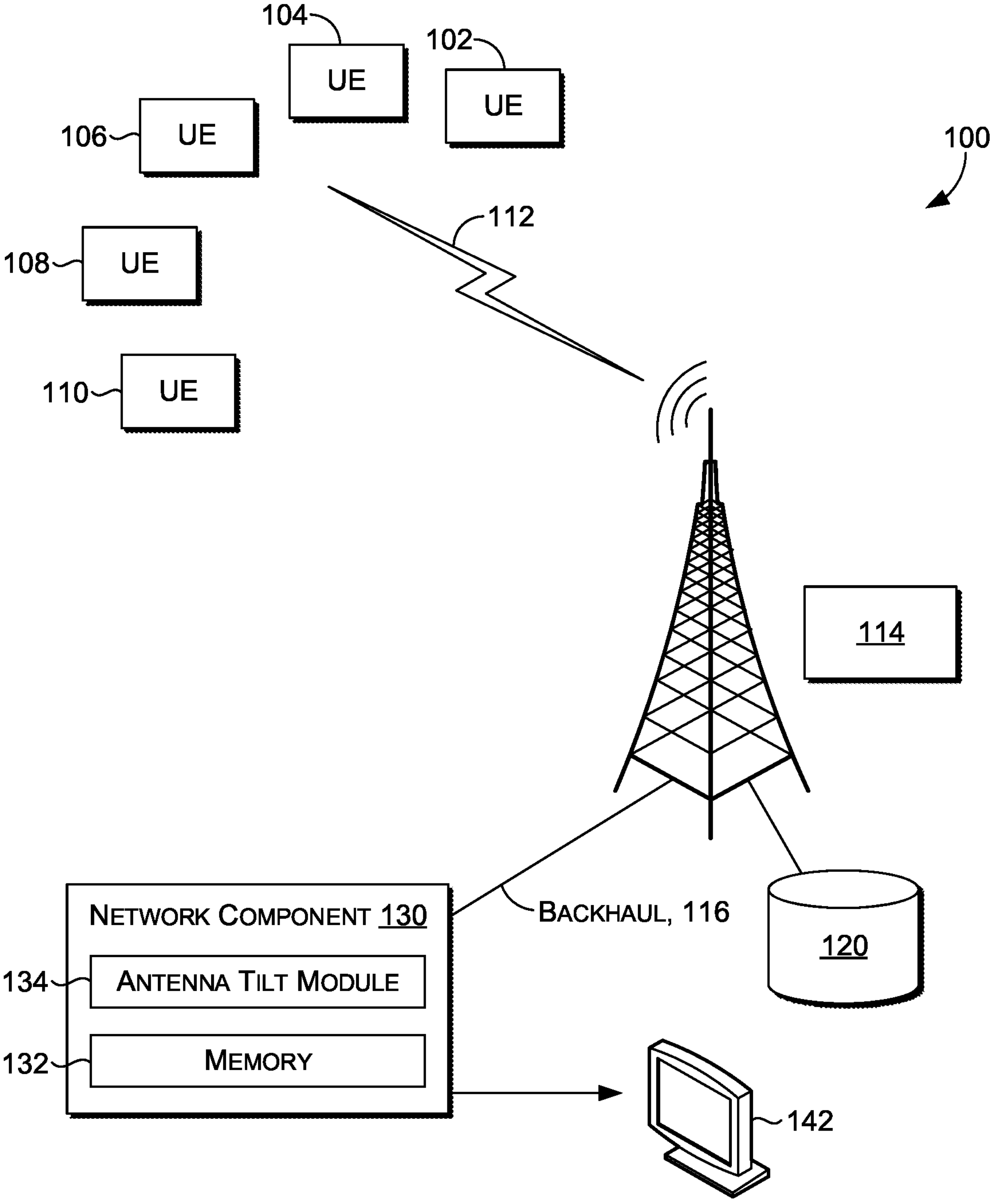
FIG. 1 depicts a diagram of an exemplary network environment in which implementations of the present disclosure may be employed, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

| | |
|---|---|
| 3G | Third-Generation Wireless Technology |
| 4G | Fourth-Generation Cellular Communication System |
| 5G | Fifth-Generation Cellular Communication System |
| 6G | Sixth-Generation Cellular Communication System |
| AI | Artificial Intelligence |
| CD-ROM | Compact Disk Read Only Memory |
| CDMA | Code Division Multiple Access |
| eNodeB | Evolved Node B |
| GIS | Geographic/Geographical/Geospatial Information System |
| gNodeB | Next Generation Node B |
| GPRS | General Packet Radio Service |
| GSM | Global System for Mobile communications |
| iDEN | Integrated Digital Enhanced Network |
| DVD | Digital Versatile Discs |
| EEPROM | Electrically Erasable Programmable Read Only Memory |
| LED | Light Emitting Diode |
| LTE | Long Term Evolution |
| MIMO | Multiple Input Multiple Output |
| MD | Mobile Device |
| ML | Machine Learning |
| PC | Personal Computer |
| PCS | Personal Communications Service |
| PDA | Personal Digital Assistant |
| PDSCH | Physical Downlink Shared Channel |
| PHICH | Physical Hybrid ARQ Indicator Channel |
| PUCCH | Physical Uplink Control Channel |
| PUSCH | Physical Uplink Shared Channel |
| RAM | Random Access Memory |
| RET | Remote Electrical Tilt |
| RF | Radio-Frequency |
| RFI | Radio-Frequency Interference |
| R/N | Relay Node |
| RNR | Reverse Noise Rise |
| ROM | Read Only Memory |
| RSRP | Reference Signal Received Power |
| RSRQ | Reference Signal Received Quality |
| RSSI | Received Signal Strength Indicator |
| SINR | Signal-to-Interference-Plus-Noise Ratio |
| SNR | Signal-to-Noise Ratio |
| SON | Self-Organizing Networks |
| TDMA | Time Division Multiple Access |
| TXRU | Transceiver (or Transceiver Unit) |
| UE | User Equipment |
| UMTS | Universal Mobile Telecommunications Systems |
| WCD | Wireless Communication Device (interchangeable with UE) |

Further, various technical terms are used throughout this description. An illustrative resource that fleshes out various aspects of these terms can be found in Newton's Telecom Dictionary, 25th Edition (2009).

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., nodes, cell sites, cell towers) to provide network coverage. The base stations are employed to broadcast and transmit transmissions to user devices of the telecommunications network. An base station may be considered to be a portion of a base station that may comprise an antenna, a radio, and/or a controller. In aspects, a base station is defined by its ability to communicate with a user equipment (UE), such as a wireless communication device (WCD), according to a single protocol (e.g., 3G, 4G, LTE, 5G, or 6G, and the like); however, in other aspects, a single base station may communicate with a UE according to multiple protocols. As used herein, a base station may comprise one base station or more than one base station. Factors that can affect the telecommunications transmission include, e.g., location and size of the base stations, and frequency of the transmission, among other factors. The base stations are employed to broadcast and transmit transmissions to user devices of the telecommunications network. Traditionally, the base station establishes uplink (or downlink) transmission with a mobile handset over a single frequency that is exclusive to that particular uplink connection (e.g., an LTE connection with an EnodeB). In this regard, typically only one active uplink connection can occur per frequency. The base station may include one or more sectors served by individual transmitting/receiving components associated with the base station (e.g., antenna arrays controlled by an EnodeB). These transmitting/receiving components together form a multi-sector broadcast arc for communication with mobile handsets linked to the base station.

As used herein, "base station" is one or more transmitters or receivers or a combination of transmitters and receivers, including the accessory equipment, necessary at one location for providing a service involving the transmission, emission, and/or reception of radio waves for one or more specific telecommunication purposes to a mobile station (e.g., a UE), wherein the base station is not intended to be used while in motion in the provision of the service. The term/abbreviation UE (also referenced herein as a user device or wireless communications device (WCD)) can include any device employed by an end-user to communicate with a telecommunications network, such as a wireless telecommunications network. A UE can include a mobile device, a mobile broadband adapter, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby base station. A UE may be, in an embodiment, similar to computing device 1000 described herein with respect to FIG. 10.

As used herein, UE (also referenced herein as a user device or a wireless communication device) can include any device employed by an end-user to communicate with a wireless telecommunications network. A UE can include a mobile device, a mobile broadband adapter, a fixed location or temporarily fixed location device, or any other communications device employed to communicate with the wireless telecommunications network. For an illustrative example, a UE can include cell phones, smartphones, tablets, laptops, small cell network devices (such as micro cell, pico cell, femto cell, or similar devices), and so forth. Further, a UE can include a sensor or set of sensors coupled with any other communications device employed to communicate with the wireless telecommunications network; such as, but not limited to, a camera, a weather sensor (such as a rain gage, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby base station.

In aspects, a UE provides UE data including location and channel quality information to the wireless communication network via the base station. Location information may be based on a current or last known position utilizing GPS or other satellite location services, terrestrial triangulation, an base station's physical location, or any other means of obtaining coarse or fine location information. Channel quality information may indicate a realized uplink and/or downlink transmission data rate, observed signal-to-interference-plus-noise ratio (SINR) and/or signal strength at the user device, or throughput of the connection. Channel quality information may be provided via, for example, an uplink pilot time slot, downlink pilot time slot, sounding reference signal, channel quality indicator (CQI), rank indicator, precoding matrix indicator, or some combination thereof. Channel quality information may be determined to be satisfactory or unsatisfactory, for example, based on exceeding or being less than a threshold. Location and channel quality information may take into account the user device capability, such as the number of antennas and the type of receiver used for detection. Processing of location and channel quality information may be done locally, at the base station or at the individual antenna array of the base station. In other aspects, the processing of said information may be done remotely.

A service state of the UEs may include, for example, an in-service state when a UE is in-network (i.e., using services of a primary provider to which the UE is subscribed to, otherwise referred to as a home network carrier), or when the UE is roaming (i.e., using services of a secondary provider providing coverage to the particular geographic location of the UE that has agreements in place with the primary provider of the UE). The service state of the UE may also include, for example, an emergency only state when the UE is out-of-network and there are no agreements in place between the primary provider of the UE and the secondary provider providing coverage to the current geographic location of the UE. Finally, the service state of the UE may also include, for example, an out of service state when there are no service providers at the particular geographic location of the UE.

The UE data may be collected at predetermined time intervals measured in milliseconds, seconds, minutes, hours, or days. Alternatively, the UE data may be collected continuously. The UE data may be stored at a storage device of the UE, and may be retrievable by the UE's primary provider as needed and/or the UE data may be stored in a cloud based storage database and may be retrievable by the UE's primary provider as needed. When the UE data is stored in the cloud based storage database, the data may be stored in association with a data identifier mapping the UE data back to the UE, or alternatively, the UE data may be collected without an identifier for anonymity.

In accordance with a first aspect of the present disclosure a method for determining antenna tilt in a network is provided. The method begins with determining an inter-site distance for at least one adjacent cell site within a beam width of an antenna of at least one cell site. Next, the inter-site distance is calculated at a predetermined overlap with at least one adjacent antenna of an adjacent cell site. The antenna is then tilted to move the calculated inter-site distance to be within a half-power beam width of the antenna. A latitude and longitude within a half-power point of the beam width of the antenna is then calculated. The tilt angel of the antenna is then calculated.

A second aspect of the present disclosure provides a system for determining antenna tilt in a network is provided. The system includes a processor and one or more computer storage hardware devices storing computer-usable instructions that, when used by the processor cause the processor to perform operations. The operations performed by the processor are: determine an inter-site distance for at least one adjacent cell site within a beam width of an antenna of at least one cell site; calculate the inter-site distance at a predetermined overlap with at least one adjacent antenna of an adjacent cell site; tilt the antenna to move the calculated inter-site distance to be within a half-power beam width of the antenna; calculate a latitude and longitude within a half power point of the beam width of the antenna; and calculate a tilt angle of the antenna.

Another aspect of the present disclosure is directed to a non-transitory computer storage media storing computer-useable instructions that, when used by one or more processors, cause the processors to determine an inter-site distance for at least one adjacent cell site within a beam width of an antenna of at least one cell site. The processors then calculate the inter-site distance at a predetermined overlap with at least one adjacent antenna of an adjacent cell site. The processors then tilt the antenna to move the calculated inter-site distance to be within a half-power beam width of the antenna. A latitude and longitude within a half-power point of the beam width of the antenna is then calculated. The processors then calculate a tilt angle of the antenna.

FIG. 1 illustrates an example of a network environment 100 suitable for use in implementing embodiments of the present disclosure. The network environment 100 is but one example of a suitable network environment and is not intended to suggest any limitation as to the scope of use or functionality of the disclosure. Neither should the network environment 100 be interpreted as having any dependency or requirement to any one or combination of components illustrated.

Network environment 100 includes UE devices 102, 104, 106, 108, and 110, base station 114 (which may be a cell site or the like), and one or more communication channels 112. The communication channels 112 can communicate over frequency bands assigned to the carrier. In network environment 100, UE devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, an extended reality device, and any combination of these delineated devices, or any other device (such as the computing device (1000)) that communicates via wireless communications with the base station 114 in order to interact with a public or private network.

Figure 10:
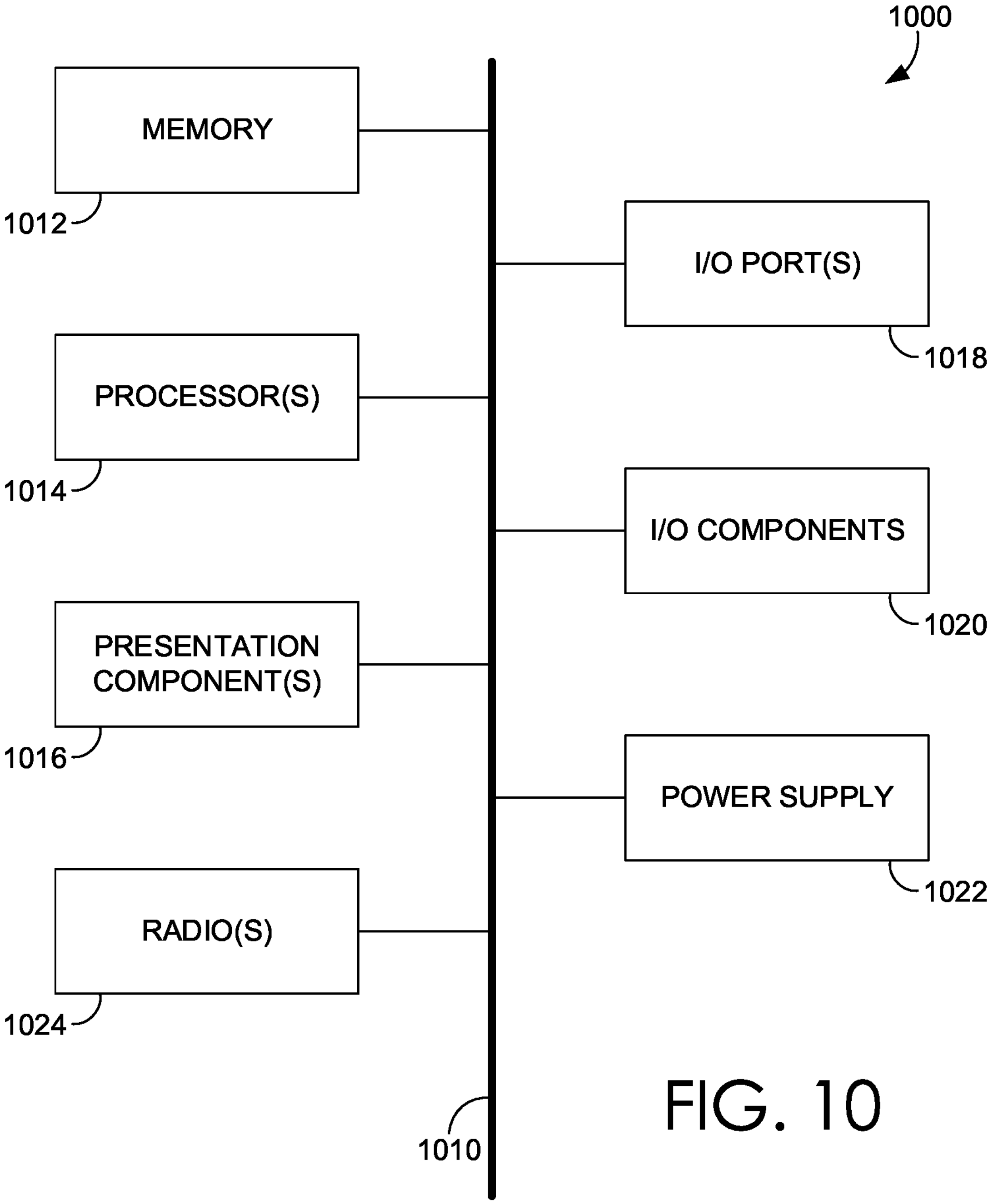
FIG. 10 depicts an exemplary computing device suitable for use in implementations of the present disclosure, in accordance with aspects herein.

In some aspects, each of the UEs 102, 104, 106, 108, and 110 may correspond to computing device 1000 in FIG. 10. Thus, a UE can include, for example, a display(s), a power source(s) (e.g., a battery), a data store(s), a speaker(s), memory, a buffer(s), a radio(s) and the like. In some implementations, for example, devices such the UEs 102, 104, 106, 108, and 110 comprise a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, 6G, LTE, CDMA, or any other type of network.

In some cases, UEs 102, 104, 106, 108, and 110 in network environment 100 can optionally utilize one or more communication channels 112 to communicate with other computing devices (e.g., a mobile device(s), a server(s), a personal computer(s), etc.) through base station 114. Base station 114 may be a gNodeB in a 5G or 6G network.

The network environment 100 may be comprised of a telecommunications network(s), or a portion thereof. A telecommunications network might include an array of devices or components (e.g., one or more base stations), some of which are not shown. Those devices or components may form network environments similar to what is shown in FIG. 1, and may also perform methods in accordance with the present disclosure. Components such as terminals, links, and nodes (as well as other components) can provide connectivity in various implementations. Network environment 100 can include multiple networks, as well as being a network of networks, but is shown in more simple form so as to not obscure other aspects of the present disclosure.

The one or more communication channels 112 can be part of a telecommunication network that connects subscribers to their immediate telecommunications service provider (i.e., home network carrier). In some instances, the one or more communication channels 112 can be associated with a telecommunications provider that provides services (e.g., 3G network, 4G network, LTE network, 5G network, 6G network, and the like) to user devices, such as UEs 102, 104, 106, 108, and 110. For example, the one or more communication channels may provide voice, SMS, and/or data services to UEs 102, 104, 106, 108, and 110, or corresponding users that are registered or subscribed to utilize the services provided by the telecommunications service provider. The one or more communication channels 112 can comprise, for example, a 1× circuit voice, a 3G network (e.g., CDMA, CDMA2000, WCDMA, GSM, UMTS), a 4G network (WiMAX, LTE, HSDPA), a 5G network or a 6G network.

In some implementations, base station 114 is configured to communicate with a UE, such as UEs 102, 104, 106, 108, and 110, that are located within the geographic area, or cell, covered by radio antennas of base station 114. Base station 114 may include one or more base stations, base transmitter stations, radios, antennas, antenna arrays, power amplifiers, transmitters/receivers, digital signal processors, control electronics, GPS equipment, and the like. In particular, base station 114 may selectively communicate with the user devices using dynamic beamforming.

As shown, base station 114 is in communication with a network component 130 and at least a network database 120 via a backhaul channel 116. As the UEs 102, 104, 106, 108, and 110 collect individual status data, the status data can be automatically communicated by each of the UEs 102, 104, 106, 108, and 110 to the base station 114. Base station 114 may store the data communicated by the UEs 102, 104, 106, 108, and 110 at a network database 120. Alternatively, the base station 114 may automatically retrieve the status data from the UEs 102, 104, 106, 108, and 110, and similarly store the data in the network database 120. The data may be communicated or retrieved and stored periodically within a predetermined time interval which may be in seconds, minutes, hours, days, months, years, and the like. With the incoming of new data, the network database 120 may be refreshed with the new data every time, or within a predetermined time threshold so as to keep the status data stored in the network database 120 current. For example, the data may be received at or retrieved by the base station 114 every 10 minutes and the data stored at the network database 120 may be kept current for 30 days, which means that status data that is older than 30 days would be replaced by newer status data at 10 minute intervals. As described above, the status data collected by the UEs 102, 104, 106, 108, and 110 can include, for example, service state status, the respective UE's current geographic location, a current time, a strength of the wireless signal, available networks, and the like.

The network component 130 comprises a memory 132 and an antenna tilt module 134. All determinations, calculations, and data further generated by the antenna tilt module 134 may be stored at the memory 132 and also at the network database 120. Although the network component 130 is shown as a single component comprising the memory 132 and antenna tilt module 134 it is also contemplated that each of the memory 132 and antenna tilt module 134 may reside at different locations, be its own separate entity, and the like, within the home network carrier system.

The network component 130 is configured to retrieve signal information, UE device information, slot configuration, latency information, including quality of service (QOS) information, and metrics from the base station 114 or one of the UE devices 102, 104, 106, 108, and 110. The information may also include RF signal quality information, such as signal to interference and noise (SINR) ratio. UE device information can include a device identifier and data usage information. The information stored in memory 132 may be used by the antenna tilt module 134.

Figure 2:
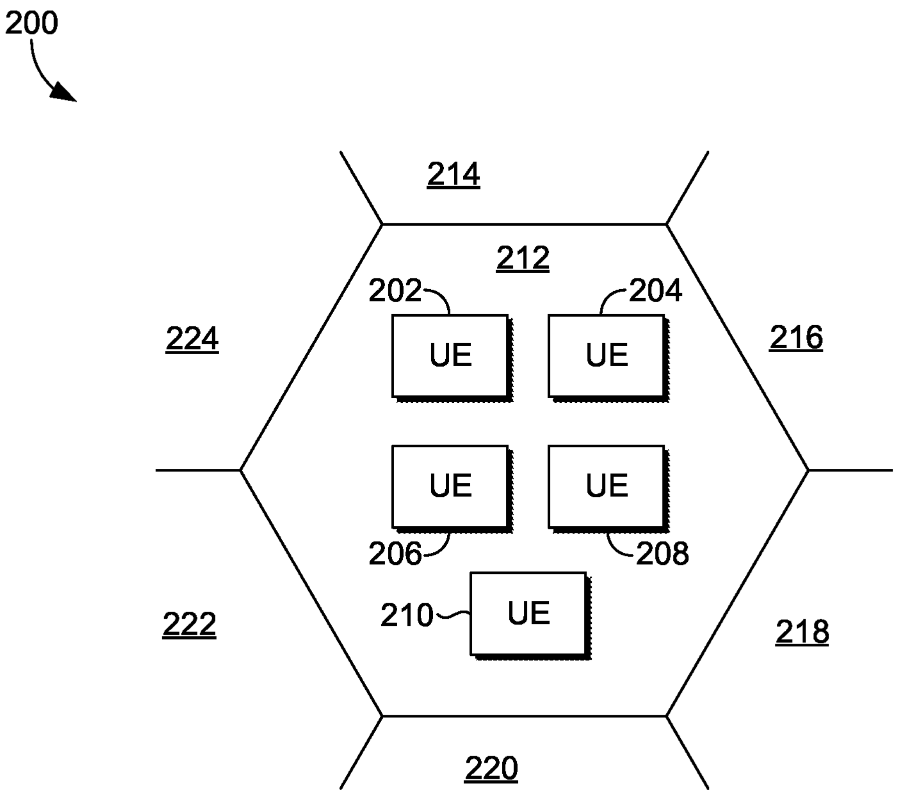
FIG. 2 depicts a cellular network suitable for use in implementations of the present disclosure, in accordance with aspects herein.

FIG. 2 depicts a cellular network suitable for use in implementations of the present disclosure, in accordance with aspects herein. For example, as shown in FIG. 2, each geographic area in the plurality of geographic areas may have a hexagonal shape such as hexagon representing a geographic area 200 having cells 212, 214, 216, 218, 220, 222, 224, each including base station or base station 114, backhaul channel 116, antenna for sending and receiving signals over communication channels 112, network database 120 and network component 130. The size of the geographic area 200 may be predetermined based on a level of granularity, detail, and/or accuracy desired for the determinations/calculations done by the systems, computerized methods, and computer-storage media. A plurality of UEs may be located within each geographic area collecting UE data within the geographic area at a given time. For example, as shown in FIG. 2, UEs 202, 204, 206, 208, and 210, may be located within geographic area 200 collecting UE data that is useable by network component 130, in accordance with aspects herein. UEs 202, 204, 206, 208, and 210 can move within the cell currently occupying, such as cell 212 and can move to other cells such as adjoining cells 214, 216, 218, 220, 222 and 224.

Figure 3:
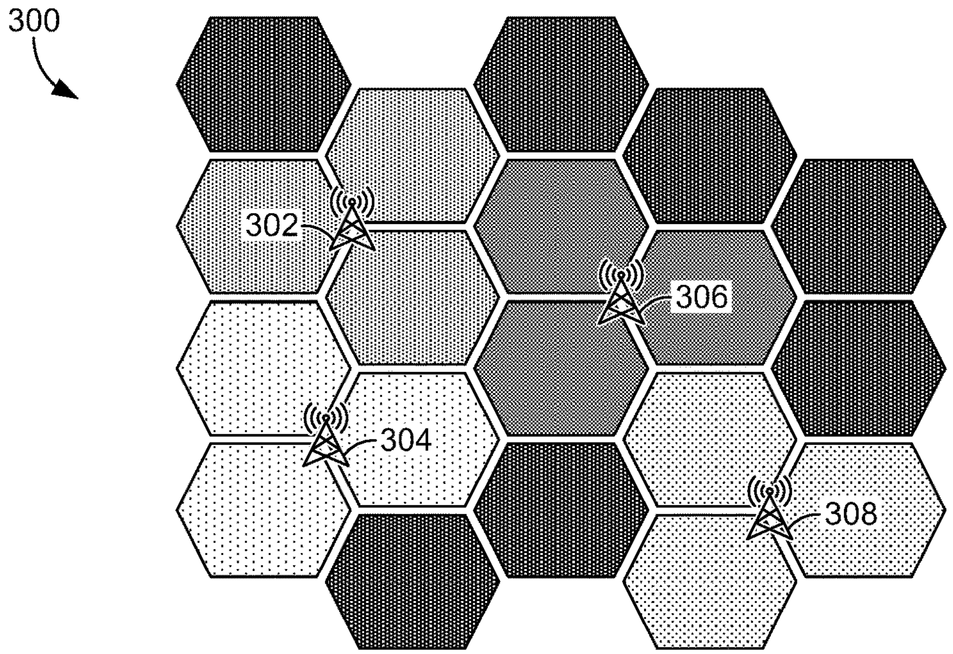
FIG. 3 depicts a diagram of cell site coverage footprint, in which implementations of the present disclosure may be employed, in accordance with aspects herein.

FIG. 3 depicts a diagram of cell site coverage footprint, in which implementations of the present disclosure may be employed, in accordance with aspects herein. The group of cells 300 includes multiple base stations 302, 304, 306, and 308. Each base station 302, 304, 306, and 308 is intended to cover a desired area, or footprint. The goal is for each base station 302, 304, 306, and 308 to cover a footprint with an adequate coverage overlap between neighboring sites to ensure that contiguous coverage is provided. Base station 302 covers three adjacent cells, as do base stations 304, 306, and 308.

Figure 4:
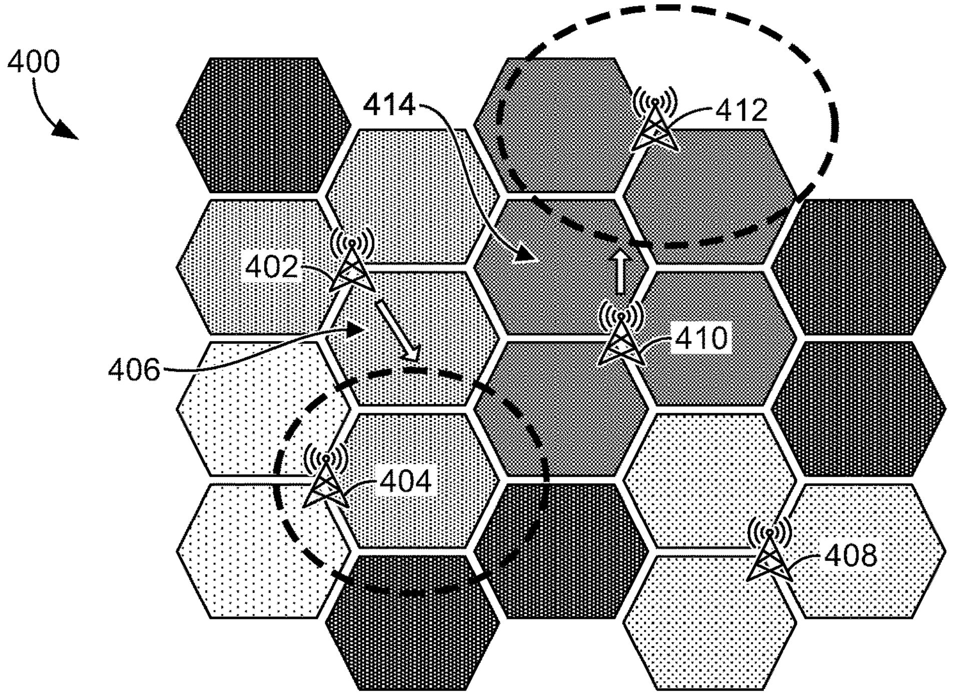
FIG. 4 depicts containment between cell sites in an exemplary network environment, in which implementations of the present disclosure may be employed, in accordance with aspects herein.

FIG. 4 depicts containment between cell sites in an exemplary network environment, in which implementations of the present disclosure may be employed, in accordance with aspects herein. The second group of cells 400 includes base stations 402, 404, 408, 410, and 412. Containment is needed for the second group of cells 400 because there may be unintentional interference to other cells in the network and it may be desirable to reduce cell overlap. Base station 402 covers three cells as shown by the gray color. However, base station 404 also covers three cells and one of the three cells covered by base station 404 is overlap cell 406. Overlap cell 406 is covered by both base stations 402 and 404 and may have significant interference as a result.

Containment is a system or process to prevent unintentional interference to other cells in the group. Containment would not be needed for base station 408 as it covers three cells with no other base station having cell coverage in common. This is not the case for base stations 410 and 412, both of which have cell overlap with overlap cell 414. Base stations 402, 404, 410 and 412 could benefit from antenna tilt adjustments to reduce or eliminate cell overlap.

Antenna tilt adjustments can reduce interference by tilting down antennas that over-shoot the coverage area. This could potentially reduce interference for base stations 402 and 404 in FIG. 4. Similarly interference between base stations 410 and 412 could be reduces by antenna tilt adjustments. In other cases, coverage area could be increased to provide greater coverage overlap. For example, base station 408 could be adjusted to increase the amount of antenna tilt, increasing the coverage area.

Antenna tilt settings can be adjusted based on antenna patterns, antenna heights. The ground terrain can also be taken into account. In hilly or mountainous areas ground terrain heights can vary greatly and the antenna tilt can be adjusted accordingly. Tall buildings may be treated similarly as terrain features. The inter-site distance may also be taken into account. Clutter data may also be factored in to the antenna tilt calculations.

Figure 5:
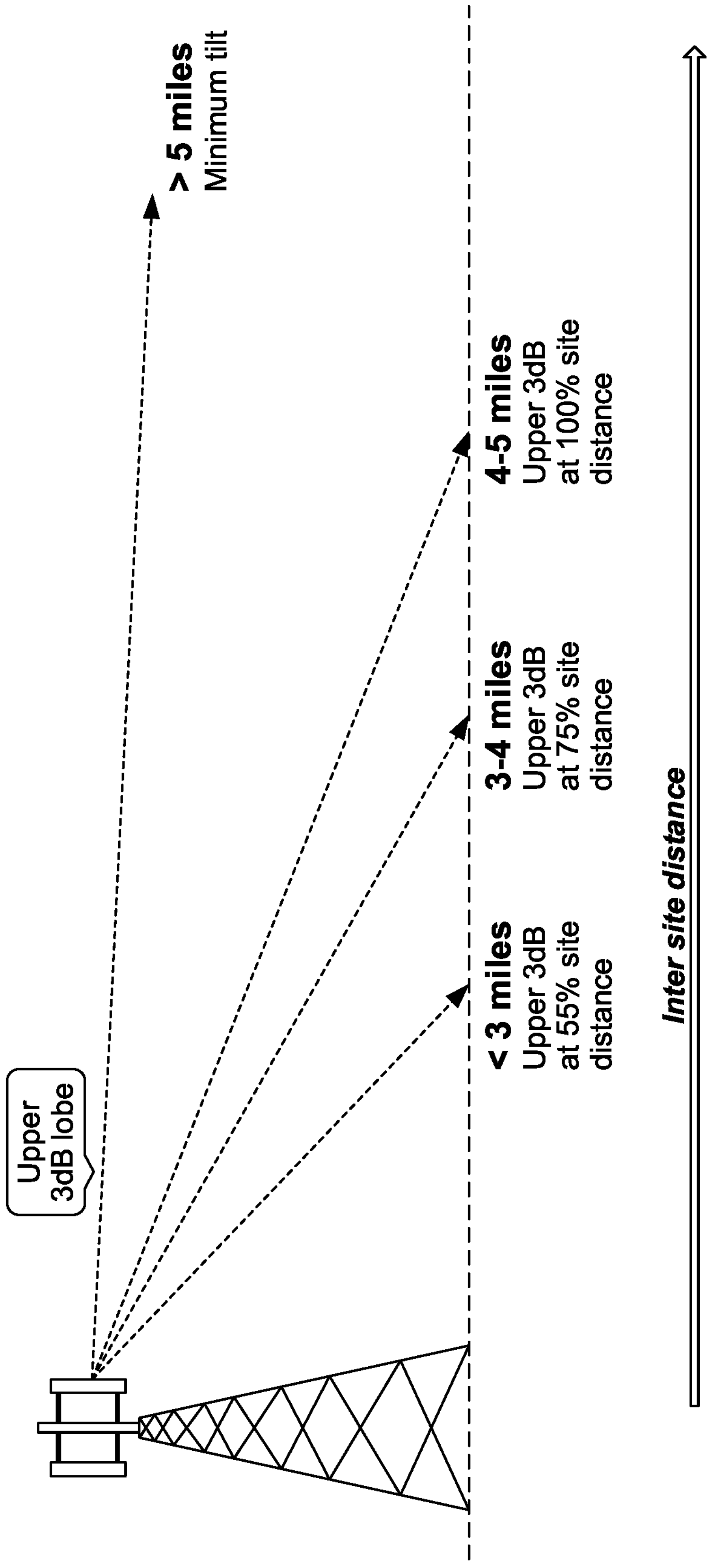
FIG. 5 depicts cell edge methodology in an exemplary network environment, in which implementations of the present disclosure may be employed, in accordance with aspects herein.

FIG. 5 depicts cell edge methodology in an exemplary network environment, in which implementations of the present disclosure may be employed, in accordance with aspects herein. The effect of variations in antenna tilt is illustrated in FIG. 5. The inter-site distance is the distance to the neighboring base station. Tilting the antenna downward significantly decreases the distance covered to less than 3 miles for the upper 3 dB point at a 55% site distance. At 75% site distance the upper 3 dB point may cover 3-4 miles, when the antenna is raised, decreasing the amount of antenna tilt. Further decreases in the antenna tilt produces an upper 3 dB point 4-5 miles at 100% site distance. When minimum tilt is used the upper 3 dB point may cover more than 5 miles, enough to overshoot the serving cell site and cause potential interference with neighboring cells.

Figure 6:
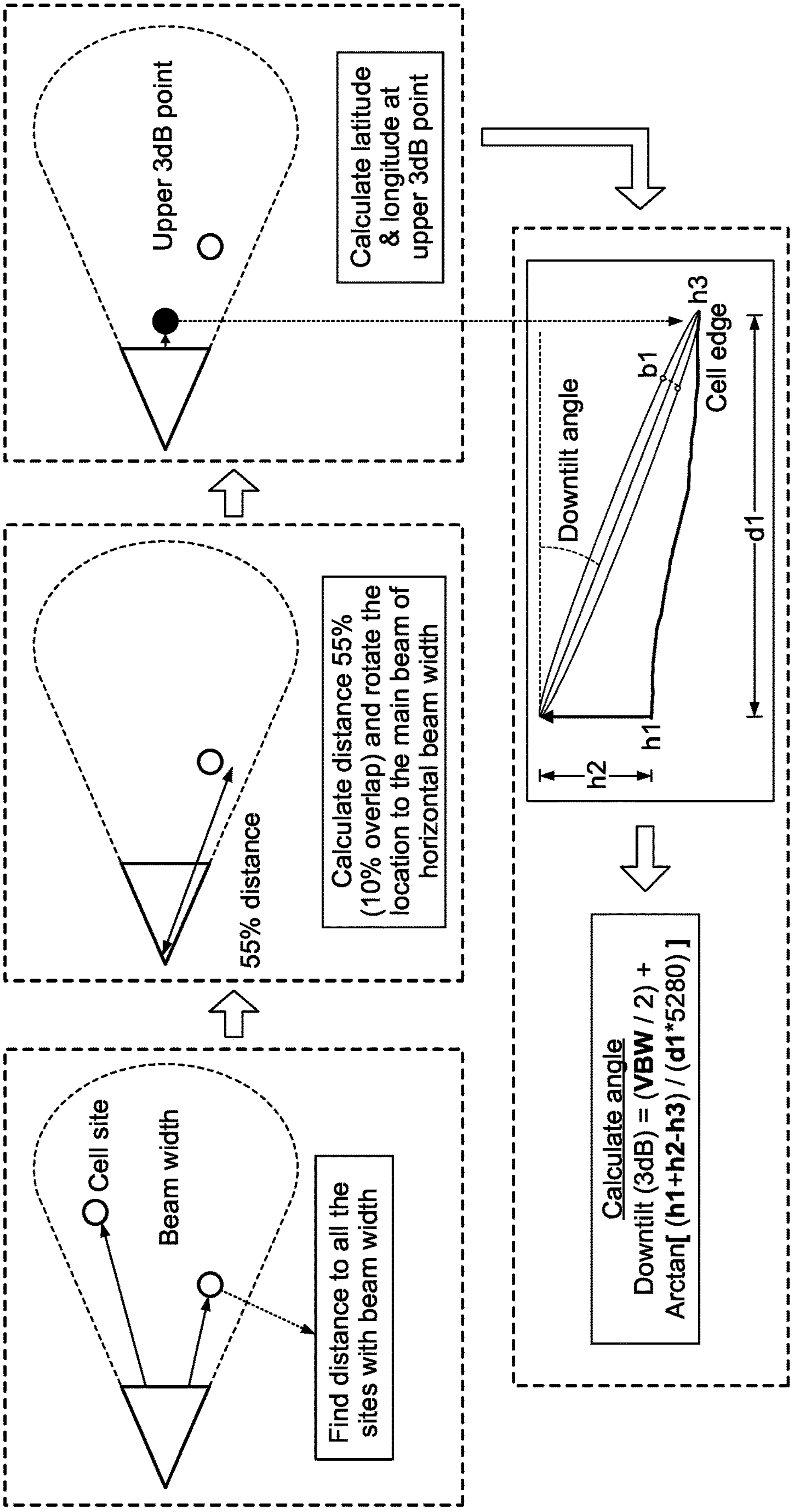
FIG. 6 depicts antenna tilt calculation in an exemplary network environment, in which implementations of the present disclosure may be employed, in accordance with aspects herein.

FIG. 6 depicts antenna tilt calculation in an exemplary network environment, in which implementations of the present disclosure may be employed, in accordance with aspects herein. To calculate antenna tilt the process begins with finding the distance to all of the adjacent cell sites with the beam width of the antenna, as shown in the first block of FIG. 6. The calculation begins with determining the inter-site distance. The 10% overlap of the 3 dB point is calculated. Next, the distance to the point of 55% overlap is determined. Then, rotate the location to the main beam of the horizontal beam width, as shown in the middle block of FIG. 6. Next, latitude and longitude are calculated at the upper 3 dB point. Then the antenna tilt angle is calculated using the formula $$\text{Down tilt (3 dB)}=(\text{VBW}/2)+\text{Arctan}[(h1+h2+h3)]$$

where

VBW is the beam width and h1, h2, and h3 are the down elevation heights. The result is the diagram showing the coverage of the antenna at the calculated antenna tilt angle. The calculations provide for 55% distance with 10% coverage overlap with contiguous coverage.

Figure 7:
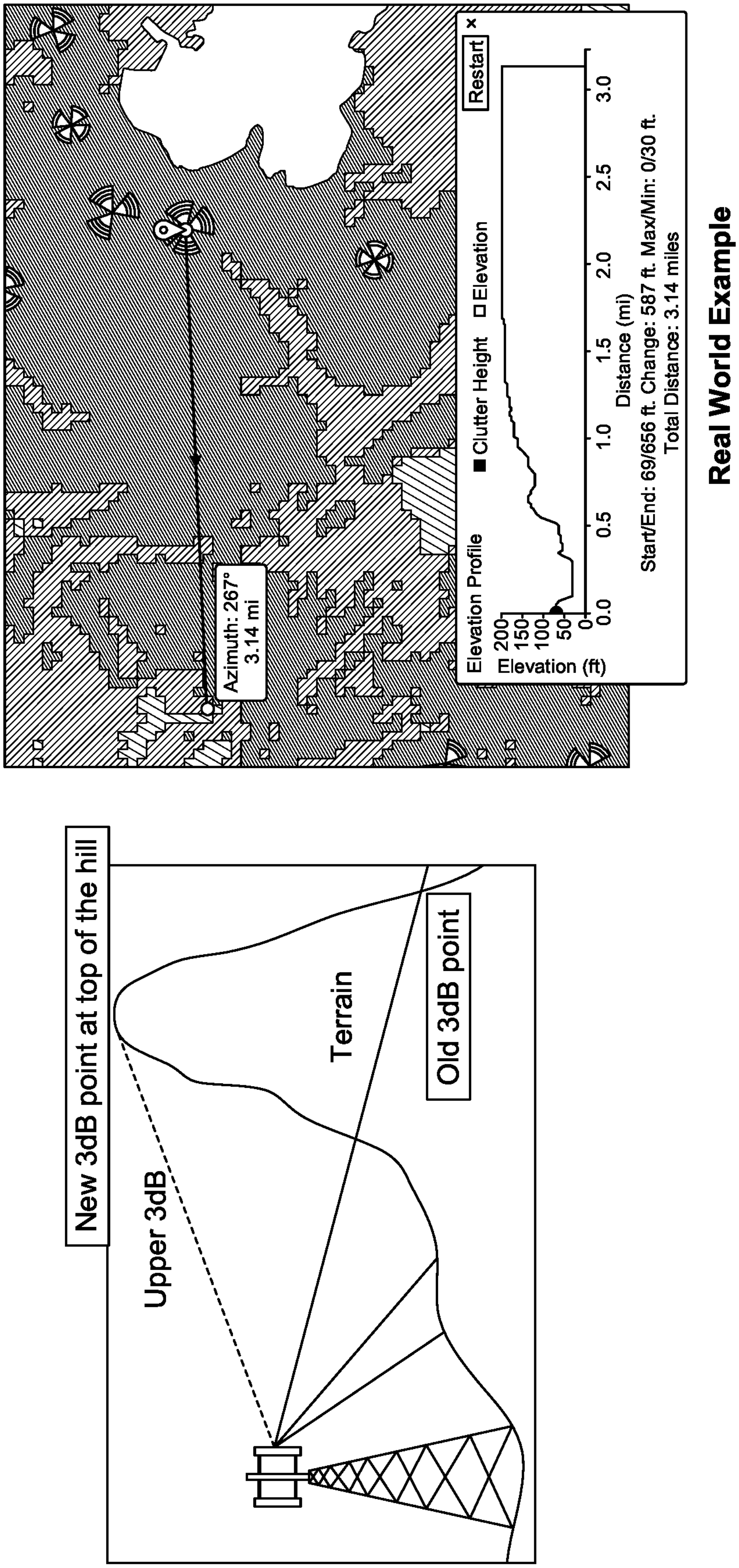
FIG. 7 depicts uphill terrain antenna tilt calculation in an exemplary network environment, in which implementations of the present disclosure may be employed, in accordance with aspects herein.

FIG. 7 depicts uphill terrain antenna tilt calculation in an exemplary network environment, in which implementations of the present disclosure may be employed, in accordance with aspects herein. The amount of antenna tilt may vary depending on the terrain. For example, FIG. 7 illustrates how the location of a 3 dB calculated without considering the terrain can affect coverage. The old 3 dB points shown in FIG. 7 are useless for any user located to the right of the hill. However, increasing the amount of antenna tilt provides a new 3 dB point is located at the top of the hill. The map and graph to the right illustrate a real world example of this adaptation of antenna tilt to provide improved coverage. While FIG. 7 illustrates a hill or natural terrain feature the same considerations apply in an urban environment with many tall buildings. In an urban environment it may also be possible to locate base stations on top of tall buildings and provide more narrowly focused coverage by using a greater amount of antenna tilt to ensure that adjacent cell sites are not adversely affected by increased interference.

Figure 8:
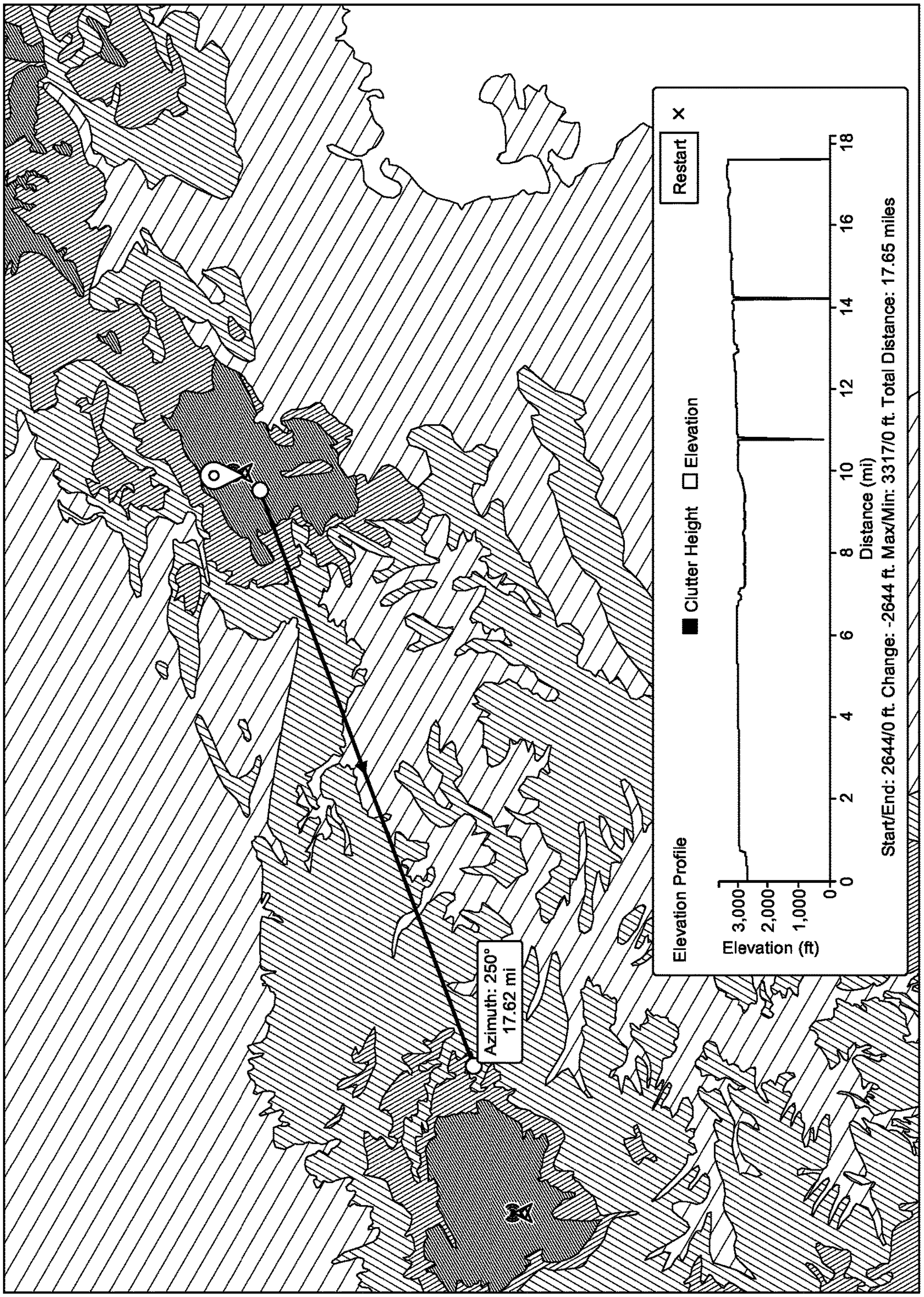
FIG. 8 depicts a fringe site antenna tilt calculation in an exemplary network environment, in which implementations of the present disclosure may be employed, in accordance with aspects herein.

FIG. 8 depicts a fringe site antenna tilt calculation in an exemplary network environment, in which implementations of the present disclosure may be employed, in accordance with aspects herein. The situation depicted in FIG. 8 is quite different from the terrain features of FIG. 7. In FIG. 8, the terrain is flat, or nearly so, and the inter-site distance is more than 17 miles away, far greater than normal in a more dense network. As a result, the degree of antenna tilt is reduced, and based on the calculations above, a 2° tilt is used. This allows service using the more distant cell site, whereas using a more conventionally calculated tilt results in a 7° tilt. Too much antenna tilt in a flatter environment produces gaps in coverage. Coverage gaps result in dropped calls and dissatisfied customers.

Figure 9:
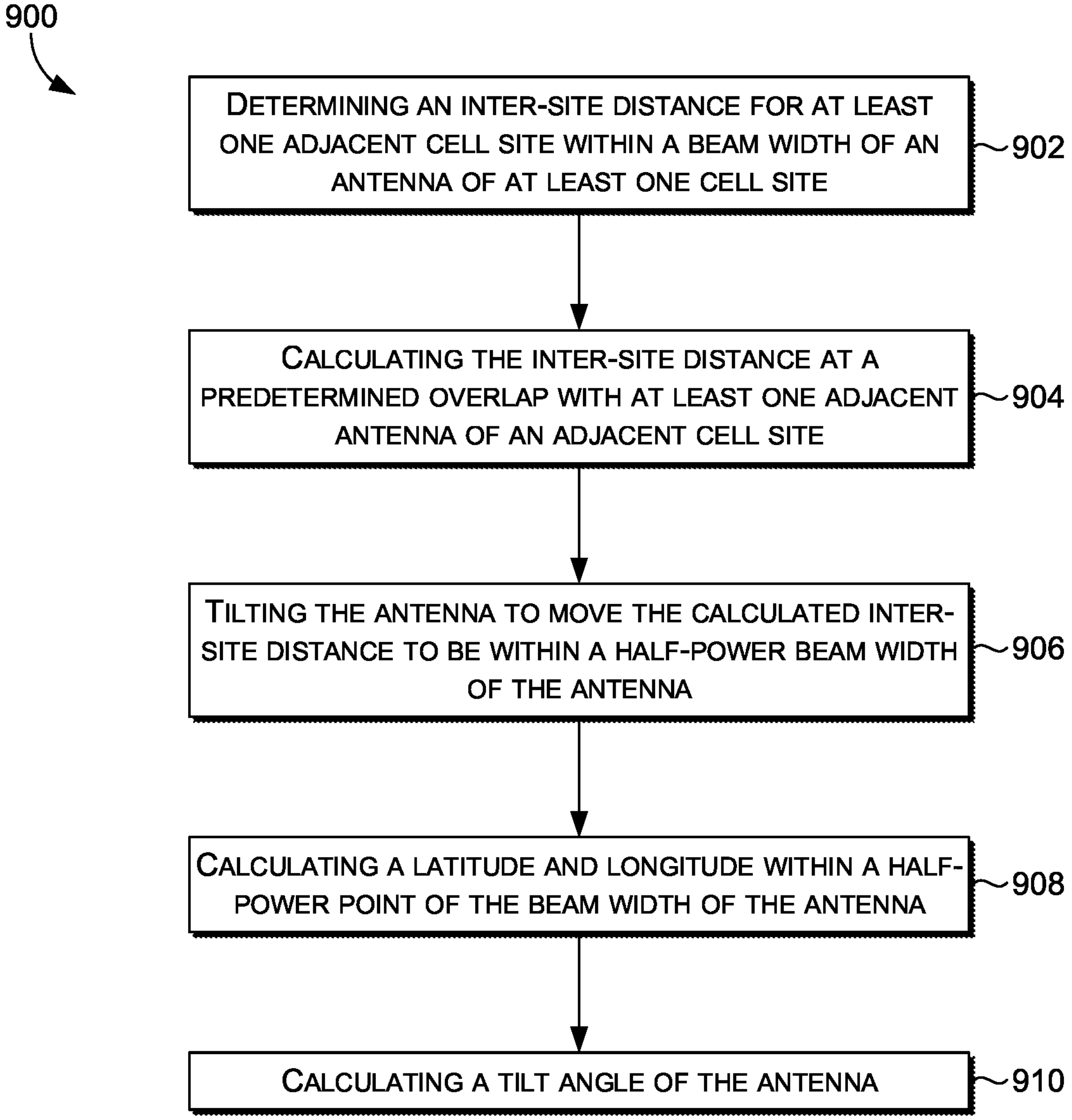
FIG. 9 is a flow diagram of an exemplary method for determining antenna tilt in an exemplary network environment, in which aspects of the present disclosure may be employed, in accordance with aspects herein.

FIG. 9 is a flow diagram of an exemplary method for determining antenna tilt in an exemplary network environment, in which aspects of the present disclosure may be employed, in accordance with aspects herein. The method 900 begins in step 902 with determining an inter-site distance for at least one adjacent cell site within a beam width of an antenna of at least one cell site. An inter-site distance may be the distance between two base stations. The base stations may serve adjacent cell sites. Next, in step 904 the method continues with calculating the inter-site distance at a predetermined overlap with at least one adjacent antenna of an adjacent cell site. The pre-determined overlap may be comprise the amount the coverage patterns of at least one antenna on an adjacent base station covers part of the coverage pattern of an antenna on an adjacent base station. Then in step 906 tilting the antenna to move the calculated inter-site distance to be within a half-power beam width of the antenna. The half-power beamwidth can be an angular width in degrees measured on the major lobe of an antenna radiation pattern at the half-power points. The half-power points can be the points at which the signal power of an antenna is half the peak power value. The method continues in step 908 with calculating a latitude and longitude within a half-power point of the beam width of the antenna. Then, in step 910 the method concludes with calculating a tilt angle of the antenna.

The predetermined overlap with at least one adjacent antenna of the adjacent cell site may be ten percent, to give one example. This provides the amount of overlap needed to ensure that UEs moving between the cell sites are not dropped. The ten percent overlap is calculated to occur at a predetermined percentage of the inter-site distance. The pre-determined percentage of the inter-site distance may be adjusted based on the nearness of adjacent cell sites and the congestion that may occur between the cell sites, as well as the interference potential of the two adjacent sites.

A half-power beam width may be used as a boundary beyond which the beams from the antenna will cause interference. The half-power point used in the calculations may be a 3 dB point. The 3 dB point may be used to adjust the antenna to allow signals to clear terrain points or provide greater coverage distance. The antenna tilt angle may be adjusted to provide clearance of terrain features or reduce coverage, such as when the antenna is mounted on a tall building or in a valley. Greater coverage distance may be preferable for fringe sites that are remote from other cell sites.

FIG. 10 depicts an exemplary computing device suitable for use in implementations of the present disclosure, in accordance with aspects herein. With continued reference to FIG. 10, computing device 1000 includes bus 1002 that directly or indirectly couples the following devices: memory 1004, one or more processors 1006, one or more presentation components 1008, input/output (I/O) ports 1012, I/O components 1010, radio 1016, transmitter 1018, and power supply 1014. Bus 1002 represents what may be one or more busses (such as an address bus, data bus, or combination thereof). Although the devices of FIG. 10 are shown with lines for the sake of clarity, in reality, delineating various components is not so clear, and metaphorically, the lines would more accurately be grey and fuzzy. For example, one may consider a presentation component such as a display device to be one of I/O components 1010. Also, processors, such as one or more processors 1006, have memory. The present disclosure hereof recognizes that such is the nature of the art, and reiterates that FIG. 10 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 10 and refer to "computer" or "computing device."

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

Computing device 1000 typically includes a variety of computer-readable media. Computer-readable media can be any available media that can be accessed by computing device 1000 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1004 includes computer-storage media in the form of volatile and/or nonvolatile memory. Memory 1004 may be removable, nonremovable, or a combination thereof. Exemplary memory includes solid-state memory, hard drives, optical-disc drives, etc. Computing device 1000 includes one or more processors 1006 that read data from various entities such as bus 1002, memory 1004 or I/O components 1010. One or more presentation components 1008 present data indications to a person or other device. Exemplary one or more presentation components 1008 include a display device, speaker, printing component, vibrating component, etc. I/O ports 1012 allow computing device 1000 to be logically coupled to other devices including I/O components 1010, some of which may be built into computing device 1000. Illustrative I/O components 1010 include a microphone, joystick, game pad, satellite dish, scanner, printer, wireless device, etc.

The radio 1016 represents one or more radios that facilitate communication with a wireless telecommunications network. While a single radio 1016 is shown in FIG. 10, it is contemplated that there may be more than one radio 1016 coupled to the bus 1002. In aspects, the radio 1016 utilizes a transmitter 1018 to communicate with the wireless telecommunications network. It is expressly conceived that a computing device with more than one radio 1016 could facilitate communication with the wireless telecommunications network via both the first transmitter 1018 and an additional transmitters (e.g. a second transmitter). Illustrative wireless telecommunications technologies include CDMA, GPRS, TDMA, GSM, and the like. The radio 1016 may additionally or alternatively facilitate other types of wireless communications including Wi-Fi, WiMAX, LTE, 3G, 4G, LTE, 5G, NR, VOLTE, or other VoIP communications. As can be appreciated, in various embodiments, radio 1016 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even base stations (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method of determining antenna tilt in a network, the method comprising:
- determining an inter-site distance for at least one adjacent cell site within a beam width of an antenna of at least one cell site;
- calculating the inter-site distance at a predetermined overlap with at least one adjacent antenna of an adjacent cell site;
- tilting the antenna to move the calculated inter-site distance to be within a half-power beam width of the antenna;
- calculating a latitude and longitude within a half-power point of the beam width of the antenna;
- calculating a tilt angle of the antenna; and
- refining the tilt angle of the antenna based on terrain features.

2. The method of claim 1, wherein the predetermined overlap with at the least one adjacent antenna of the adjacent cell site is ten percent.

3. The method of claim 2, wherein the ten percent overlap with the at least one adjacent antenna occurs at a predetermined percentage of the inter-site distance.

4. The method of claim 3, wherein the predetermined percentage of the inter-site distance is 55 percent.

5. The method of claim 1, wherein the half-power point of the main beam width of the antenna is a 3 dB point.

6. The method of claim 1, further comprising modifying the tilt angle of the antenna to the calculated tilt angle.

7. The method of claim 6, wherein the terrain features are higher in elevation than the antenna.

8. A system for determining antenna tilt in a network, the system comprising:
- a processor; and
- one or more computer storage hardware devices storing computer-usable instructions that, when used by the processor, cause the processor to:
- determine an inter-site distance for at least one adjacent cell site within a beam width of an antenna of at least one cell site;
- calculate the inter-site distance at a predetermined overlap with at least one adjacent antenna of an adjacent cell site;
- tilt the antenna to move the calculated inter-site distance to be within a half-power beam width of the antenna;
- calculate a latitude and longitude within a half-power point of the beam width of the antenna;
- calculate a tilt angle of the antenna;
- refine the tilt angle of the antenna based on terrain features; and
- modify the tilt angle of the antenna based on the calculated tilt angle and the refined tilt angle.

9. The system of claim 8, wherein the predetermined overlap with at least one adjacent antenna of the adjacent cell site is ten percent.

10. The system of claim 9, wherein the ten percent overlap with at least one adjacent antenna occurs at a predetermined percentage of the inter-site distance.

11. The system of claim 10, wherein the predetermined percentage of the inter-site distance is 55 percent.

12. The system of claim 8, wherein the half-power point of the main beam width of the antenna is a 3 dB point.

13. The system of claim 11, wherein the terrain features are higher in elevation than the antenna.

14. The system of claim 11, wherein the terrain features are lower in elevation than the antenna.

15. A non-transitory computer storage media storing computer-useable instructions that, when used by one or more processors, cause the processors to:
- determine an inter-site distance for at least one adjacent cell site within a beam width of an antenna of at least one cell site;
- calculate the inter-site distance at a predetermined overlap with at least one adjacent antenna of an adjacent cell site;
- tilt the antenna to move the calculated inter-site distance to be within a half-power beam width of the antenna;
- calculate a latitude and longitude within a half-power point of the beam width of the antenna; and
- calculate a tilt angle of the antenna;
- wherein the predetermined overlap with the at least one adjacent antenna of the adjacent cell site occurs at a predetermined percentage of the inter-site distance.

16. The non-transitory computer storage media of claim 15, wherein the predetermined overlap with at least one adjacent antenna of the adjacent cell site is ten percent.

17. The non-transitory computer storage media of claim 15, wherein the predetermined percentage of the inter-site distance is 55 percent.

* * * * *